Sept. 25, 1951 E. L. LIVERMORE 2,569,183
ELEVATION ADJUSTMENT FOR GUN-MOUNTED TELESCOPES
Filed Oct. 19, 1950
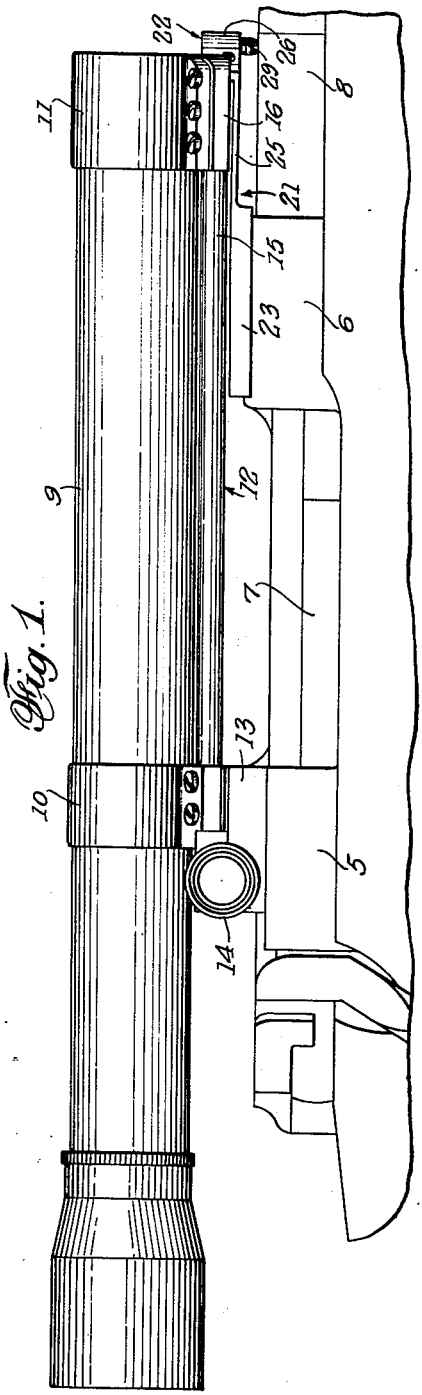
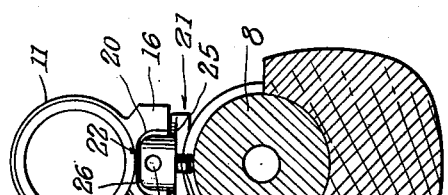
Inventor
EARL L. LIVERMORE
By C. G. Stratton
Attorney Patented Sept. 25, 1951

2,569,183

UNITED STATES PATENT OFFICE 2,569,183

ELEVATION ADJUSTMENT FOR GUN-MOUNTED TELESCOPES

Earl L. Livermore, Los Angeles, Calif.

Application October 19, 1950, Serial No. 191,048

2 Claims. (Cl. 33—50)

This invention relates to an adjustable telescope mount for fire-arms and particularly for rifles.

In my allowed application, Serial No. 771,811, now Patent No. 2,510,289, issued June 6, 1950, I have disclosed a telescope mount embodying longitudinally spaced mount bases of which the rear base embodies windage adjusting means. The telescope shown in said application embodies elevation adjusting means. In order to obviate the need for such a telescope and enable the use of one that does not have such means and is, therefore, less costly, it is an object of the present invention to provide elevation adjustment means in one of the mount bases and preferably the one not having the windage adjustment means.

It is a more specific object of the invention to provide a novel mount base for a telescope that embodies means effecting separable connection to a telescope and also elevation adjustment means, whereby said mount base has a dual function and is relatively inexpensive.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a partial side elevational view of a gun mounting a telescope sight and embodying features of the present invention.

Fig. 2 is an end view as seen from the right of Fig. 1.

Fig. 3 is a fragmentary longitudinal sectional view of the novel mounting means of the present invention.

Fig. 4 is a plan view showing the elevation-adjustable mount base.

The gun, in a conventional manner, is provided with spaced metal blocks 5 and 6 on each end of the breech 7 and has a barrel 8 that extends forwardly from block 6. A conventional telescope 9 is provided with spaced mount bands 10 and 11 that are interconnected by a tube assembly 12. The band 10 is designed to removably engage a mount base 13 that is affixed to block 5 and said mount base, as disclosed in said application, includes windage adjustment means that is operable by knob 14 to laterally move and adjust the rearward end of telescope 9 relative to the line of barrel 8. The tube 15, of assembly 12, extends into a base 16 formed on band 11 and is fixed therein by a cross-pin 17. Said pin 17 also serves to limit the projected position of a locking pin 18 telescopically engaged in tube 16 and projected in an outward direction by a spring 19 within said tube. Band base 16 is formed with a cavity 20 that is open at the end and at the bottom. The foregoing generally follows the disclosure in the mentioned application except that the telescope itself is shown without elevation adjustment means.

According to the present invention, the block 6 is provided with means 21 for connecting the forward end of the telescope to the gun, said means embodying elevation adjustment means 22 that cooperates with gun barrel 8.

The means 21 comprises a plate 23 which, by means of screws 24, is affixed to the top of block 6. The means 22 comprises a resilient forward extension 25 of plate 23, the same constituting a spring tongue flexible in a vertical plane, a thickened portion 26 on the free end of said tongue and having intersecting holes 27 and 28, an adjusting screw 29 threadedly engaged in one hole, and a lock or set screw 30, carried by portion 26 and impinged against screw 29 to hold adjustment thereof.

Hole 27 is aligned with pin 18 and is receptive thereof to effect mounting connection of the forward end of the telescope with the gun. Since said pin 18 is engaged with a resiliently mounted part, such connection is resilient.

Hole 28 extends vertically through tongue portion 26 and, below where the same intersects hole 27, is threaded for screw 29. The latter is, therefore, accessible for adjustment through the upper part of hole 28.

Screw 29, as shown, extends downward from the tongue and engages the top of the gun barrel 8 therebelow. Consequently, said screw can be adjusted to flex tongue 17 to elevate or lower the forward end of the telescope relative to where the same is mounted by band 10 on mount base 13. Such adjustments are quite minute and have no appreciable effect on the rear mount of the telescope.

It will be noted that screw 29 is accessible immediately forward of the forward end of the telescope and, therefore, is always within reach and that by setting screw 30 with sufficient tightness against screw 29, the latter will hold its adjustment under all conditions of use of the gun. Also, when the scope is removed, hole 27 constitutes a peep-hole whereby the gun may be sighted.

While the invention that has been illustrated and described is now regarded as the preferred embodiment, the construction is, of course, subject to modifications without departing from the spirit and scope of the invention. It is therefore not desired to restrict the invention to the particular form of construction illustrated and described, but to cover all modifications that may fall within the scope of the appended claims.

Having thus described the invention, what is claimed and desired to be secured by Letters Patent is:

1. A telescope mount for a gun having rearward and forward longitudinally spaced mounting blocks on each end of the breech of said gun, the barrel of said gun extending forwardly of the forward block, and a telescope longitudinally disposed above said blocks, the ends of the telescope extending respectively rearward and forward of said rearward and forward blocks, said mount comprising a mount base affixed to the rearward block, a first mount band carried by an intermediate part of the telescope in operative alignment with said mount base, windage adjusting means between said base and band to laterally adjust the rearward end of the telescope relative to the forward end thereof, a second mount band on the forward end of said telescope and located forwardly of the forward mounting block, a tube beneath the telescope and etxending between and connecting the mount bands, a spring-urged pin in the forward end of said tube and having an end protruding forwardly from said tube end, a plate fixedly mounted on the forward mounting block, a forwardly directed flexible extension on said plate, the same being flexible in a vertical plane relative to the gun barrel, said extension having an aperture in its free end disposed to receive the protruding end of said pin to, thereby, connect the forward end of the telescope to said flexible extension, and a vertically disposed set screw in said flexible extension end directed to impinge on the gun barrel therebeneath, said screw being vertically adjustable to flex said extension to, thereby, adjust the elevation of the telescope relative to the gun barrel.

2. A telescope mount according to claim 1: only the end of said flexible extension that carries the set screw extending forwardly of the forward end of the telescope to expose said set screw for adjustment, the remainder of said extension and the plate on which the same is formed residing wholly beneath the forward end of the telescope.

EARL L. LIVERMORE.

REFERENCES CITED

The following references are of record in the file of this patent:

UNITED STATES PATENTS

| Number | Name | Date |
| --- | --- | --- |
| 2,193,302 | Stith | Mar. 12, 1940 |
| 2,365,976 | Sorensen | Dec. 26, 1944 |
| 2,510,289 | Livermore | June 6, 1950 |

FOREIGN PATENTS

| Number | Country | Date |
| --- | --- | --- |
| 540,826 | Great Britain | 1941 |